(12) United States Patent  (10) Patent No.: US 7,828,316 B1
Joseph  (45) Date of Patent: Nov. 9, 2010

(54) DISPLAY ENCLOSURE TRAILER FOR BOATS

(76) Inventor: Christopher Joseph, P.O. Box 274, Irondale, OH (US) 43932

( * ) Notice: Subject to any disclaimer, the term of this patent is extended or adjusted under 35 U.S.C. 154(b) by 0 days.

(21) Appl. No.: 12/386,377

(22) Filed: Apr. 17, 2009

Related U.S. Application Data

(63) Continuation of application No. 11/353,280, filed on Feb. 13, 2006, now abandoned.

(51) Int. Cl.
  *B62D 63/08* (2006.01)
  *B60P 3/10* (2006.01)
(52) U.S. Cl. .................................. 280/414.1
(58) Field of Classification Search ............. 280/414.1
  See application file for complete search history.

(56) References Cited

U.S. PATENT DOCUMENTS 3,773,195 A * 11/1973 Honea ................ 414/534
4,223,414 A    9/1980 Dickson
4,767,132 A    8/1988 Avery
5,481,999 A    1/1996 Clark
5,549,438 A    8/1996 Dwyer et al.
6,447,038 B1   9/2002 Davis et al.

FOREIGN PATENT DOCUMENTS

GB    2199549 A * 7/1988

* cited by examiner

*Primary Examiner*—Anne Marie M Boehler
*Assistant Examiner*—Daniel Yeagley
(74) *Attorney, Agent, or Firm*—Harpman & Harpman

(57) ABSTRACT

A boat trailer that has a retractable display cover and support structure to fully enclose a sport boat during transport and provide multiple display surfaces for commercial endorsement indicia thereon. The trailer incorporates enclosure trailer frame panels with removable undercovers and selectively retractable cover frame with stressed flexible material panels and a storage access enclosure on an integrated boat support and launching frame.

6 Claims, 5 Drawing Sheets

DISPLAY ENCLOSURE TRAILER FOR BOATS

This is a continuation of application Ser. No. 11/353,280, filed Feb. 13, 2006 now abandoned.

BACKGROUND OF THE INVENTION

1. Technical Field

This invention relates to small water craft trailers of the type that allow for transport launching and recovery of boats, such as fishing boats.

2. Description of Prior Art

Prior art trailers of this type have provided a variety of different configurations that include covers for the boat on the trailers, see for example U.S. Pat. Nos. 4,223,414, 4,767,132, 5,481,999, 5,549,438 and 6,447,038.

In U.S. Pat. No. 4,223,414 a combined trailer and boat cover is disclosed having a trailer with single or multiple cover portions hinged from a support structure to overlie a boat positioned on the trailer.

U.S. Pat. No. 4,767,132 is directed to an enclosed trailer for boats in which a support trailer frame having multiple sides, ends and top walls form a rigid enclosure for the boat removably positioned therewithin. Wall portions are movable for access to the boat.

U.S. Pat. No. 5,481,999 claims a trailer mounted boat cover that uses a rigid forward shield from which a flexible cover is deployed over the surface of the boat on the trailer.

U.S. Pat. No. 5,549,438 is a universal covered trailer for boats which has multiple fixed sidewalls, end wall and integrated top of which a portion is pivoted as a hatchback like configuration for opening and access to the boat therewithin.

U.S. Pat. No. 6,447,038 is directed to an enclosed trailer for boats having a boat holding trailer frame with a widget integrated cover walled configuration that forms a shell enclosure over the boat and is removed by lifting the shell vertically off the trailer for access to the boat therein by a pulley and line system.

SUMMARY OF THE INVENTION

A self-contained boat trailer with a retractable self-supporting flexible canopy having surface display areas for commercial indicia thereon. The trailer frame has a pair of rigid angularly disposed enclosed sidewalls defining a deployment and support tracks for a movable segmented canopy support frame with integral flexible interconnected fabric panels therebetween. Secondary flexible protection panels are removably secured along the bottom of the boat support frame providing for an enclosure covered configuration with a retractable display canopy.

DETAILED DESCRIPTION OF THE INVENTION

Figure 1:
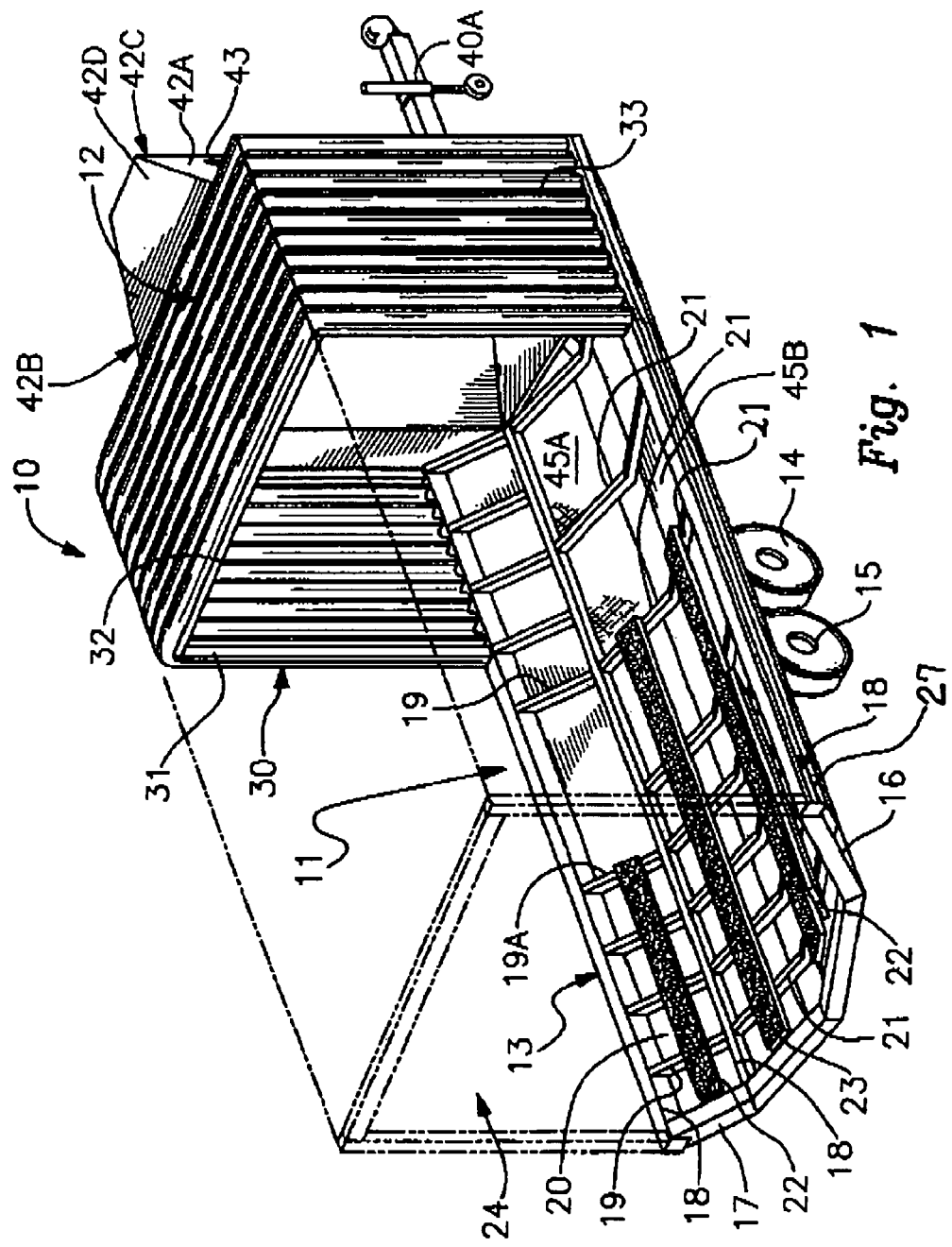
FIG. 1 is a perspective view of a trailer in accordance with the present invention in a partial open access position.
Figure 2:
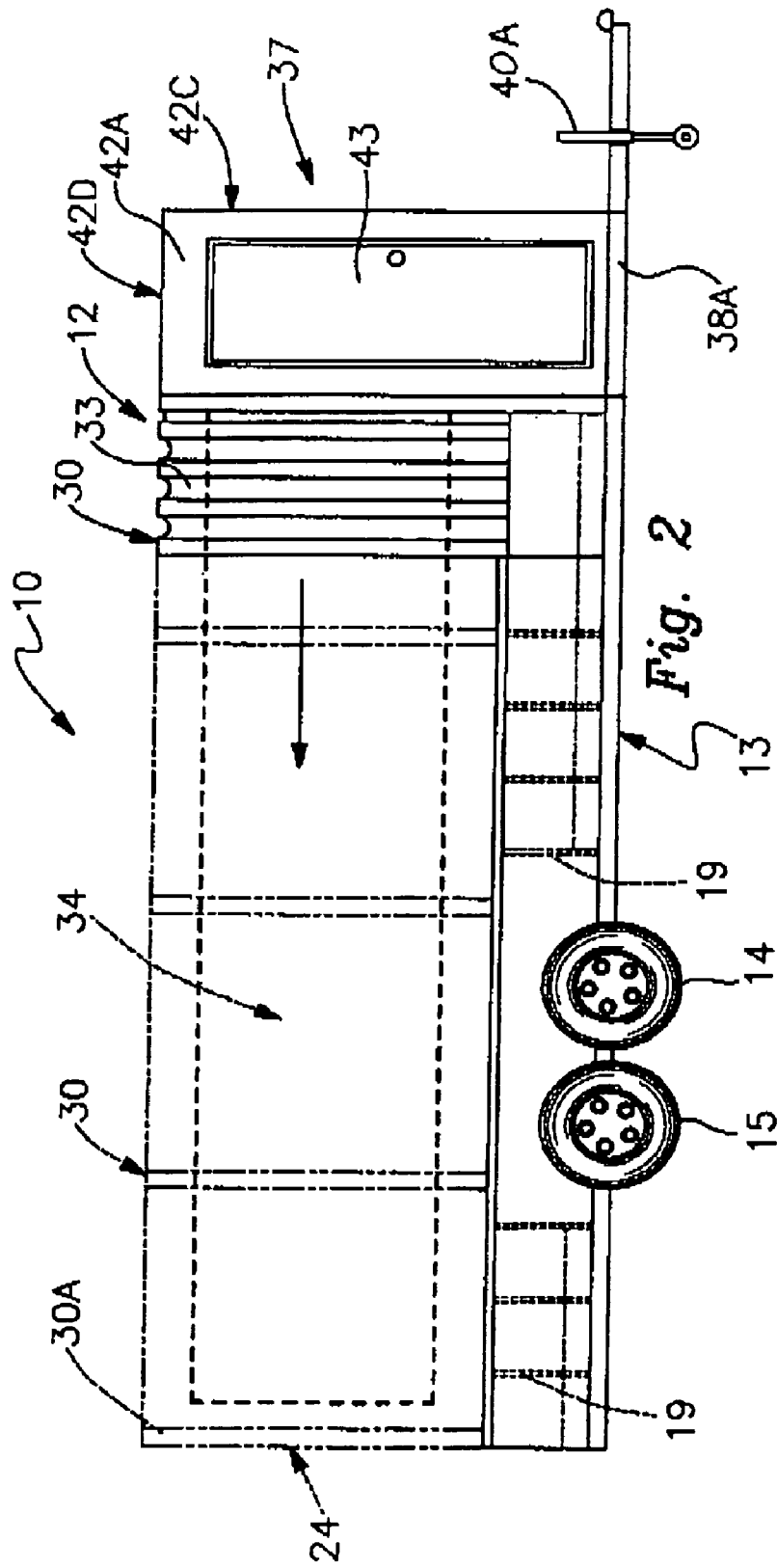
FIG. 2 is a side elevational view thereof.
Figure 3:
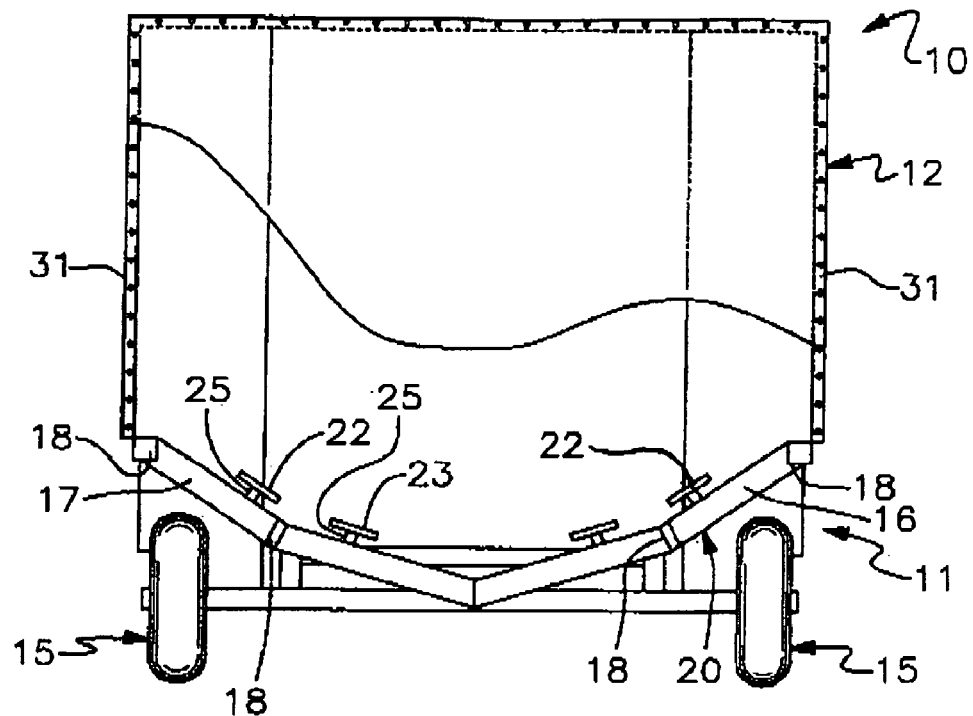
FIG. 3 is an end elevational view of the boat access end of the enclosed trailer with portions broken away for illustration.

Referring to FIGS. 1-3 and 5 of the drawings, an enclosed boat trailer 10 of the invention can be seen having a trailer portion 11 and a canopy portion 12. The trailer portion 11 has a metal frame 13 with a pair of wheel and axle assemblies 14 and 15 secured thereto; the frame 13 has oppositely disposed longitudinally extending covered side frame walls 16 and 17 which are in angular inclination to one another. Each of the side frame walls 16 and 17 have spaced parallel rails 18 with transverse ribs 19 therebetween and rigid cover panels 20 on their exterior surface. The respective side frame walls 16 and 17 are interconnected by a plurality of transversely extending parallel cross members 21 which are contoured defining a generally V-shaped construction as best seen in FIG. 3 of the drawings.

Pairs of boat engagement guide slide planks 22 and 23 extend in spaced parallel relation to one another longitudinally inward from the access end 24 of the trailer 10. Guide slide plank pairs 22 and 23 are mounted on support spacers 25 on the respective cross members 21 and ribs 19 extending transversely thereacross. The guide slide plank pairs 22 extends longitudinally to a transverse rib 19A while the slide plank pair 23 extends therebeyond over the wheel and axle assembly 15 to the wheel and axle assembly 14 and provides full support for the positioning of a boat, not shown, to be slidably positioned thereon as will be understood by those skilled in the art.

It will be evident from the foregoing description that the covered angular inclined side frame walls 16 and 17 will extend vertically beyond the typical boat trailer frame (not shown) to provide, in essence, protective screens for the lower portion of the boat 26 positioned on the guide slide plank pairs 22 and 23 within the trailer 10.

Figure 4:
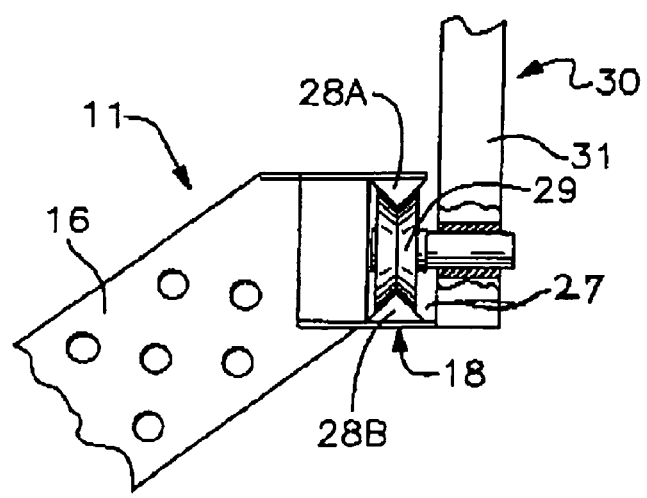
FIG. 4 is an enlarged end elevational view of a guide track and frame roller support assembly.

Each of the outer most rails 18 of the respective side frame walls 16 and 17 having a canopy guide channel 27 formed therein, as best seen in FIGS. 3 and 4 of the drawings.

The guide channel 27 has vertically aligned dual registration tracks 28A and 28B therewithin for registerable engagement with guide wheels 29.

Multiple U-shaped canopy ribs 30 have oppositely disposed spaced parallel vertical members 31 each of which have the canopy guide wheel 29 rotatably positioned on their respective free ends. Top support members 32 interconnect to corresponding transversely aligned vertical rib members 31 forming the completed U-shaped canopy rib structure 30.

Figure 6:
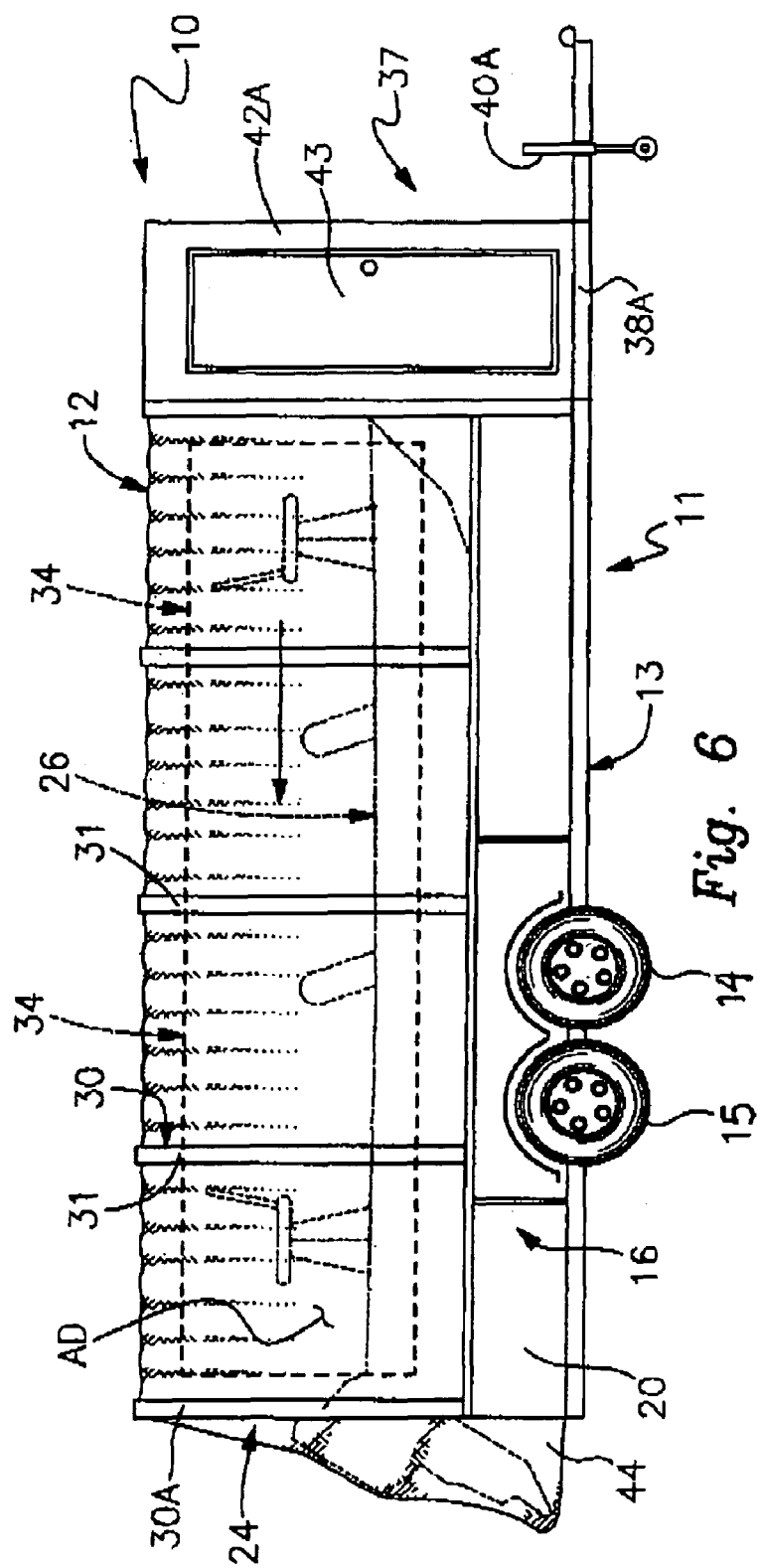
FIG. 6 is a side elevational view of the enclosed trailer of the invention in use with a boat illustrated thereon.

The flexible sheet fabric panels 33 are secured to and extend between the canopy ribs 30 defining large display side surfaces 34 on each side thereof with an integral top surface 36 when in extended position as seen in FIG. 6 of the drawings. The multiple canopy ribs 30 and interconnected fabric panels 33 define a retractable collapsible enclosure for the trailer that extends from an enclosed front toe portion 37 to a boat access end portion 24 when fully deployed as seen in FIG. 6 of the drawings.

The enclosed front toe portion 37 is defined and is formed where the frame 13 extends beyond the hereinbefore described frame sidewalls 16 and 17 as a generally horizontally disposed structure.

Angularly disposed side rails 38A and 38B are interconnected by an end rail 39 from which a trailer hitch tongue assembly 40 which longitudinally extends therethrough, as noted.

A boat bow engagement roller and winch assembly 41 within a portion of the frame 13 of the enclosed front toe end portion 37 defined by the hereinbefore described rails 38A and 38B, end rail 39 and the hitch tongue assembly 40 which in combination define an intermediate frame support structure.

An extensible hitch support wheel assembly 40A secured to the frame elements of the toe portion 37 as is known within the art for trailer support when not attached to a tow vehicle (not shown).

The enclosed front toe portion 37 has enclosure sidewalls 42A and 42B, end wall 42C and an integral top portion 42D with an access door 43 in the sidewall 42A.

In operation, the canopy ribs 30 of the trailer 10 move laterally within the respective and hereinbefore described corresponding guide channels 27 from the enclosed front toe portion 37 longitudinally the length of the hereinbefore described support frame retained to a fully closed "display" position. A flexible fabric end closure panel 44 is removably secured to an access end rib 30A of the canopy ribs 30 closing over the boat 26 as seen in FIG. 3 of the drawings.

Figure 5:
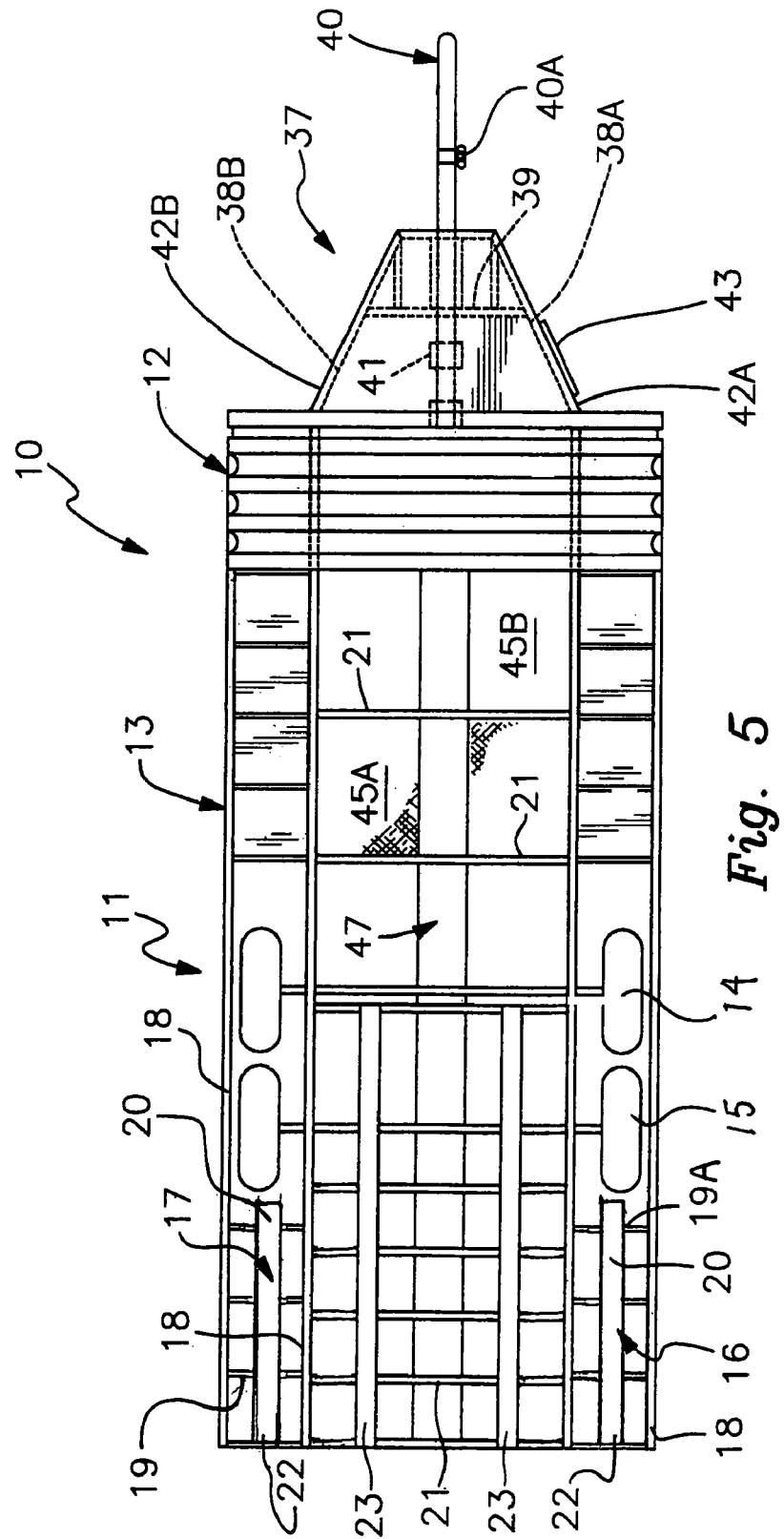
FIG. 5 is a top plan view of the enclosed trailer of the invention with portions broken away.

Referring now to FIG. 5 of the drawings, a pair of removable cloth bottom covers 45A and 45B can be seen in position on the trailer frame 10 as being selectively and removably secured longitudinally on the bottom transverse of the trailer ribs 19 and the respective inner rails 18 of the side frame walls 16 and 17.

The covers 45A and 45B extend from the perspective inner rails 18 leaving a longitudinal opening at 47 the length of the trailer 10 therebetween.

The display side surface area 34 on the fabric panels 33 provide space for advertising indicia associated with sponsorship of professional fishing tournaments which will be visible anytime the canopy is closed, that is deployed over the trailer 10 thereby expanding the respective inner engaging panel sections 33 between the canopy ribs 30 as illustrated in FIG. 6 of the drawings.

It will thus be seen that a new and novel boat trailer configuration has been illustrated and described which includes an integrated semi-enclosed closure system for the trailer and the boat associated therewith in which display sponsorship indicia can be easily and effectively applied to the outer canopy surfaces with a unique combination of an enclosed trailer configuration which protects the boat as well as providing sponsorship surfaces thereon.

Therefore I claim:

1. A boat trailer comprising, a longitudinal V-shaped support frame and a retractable canopy portion,
    said V-shaped support frame comprising transport wheel assemblies and a trailer hitch secured to said support frame,
    said longitudinal V-shaped support frame comprises a plurality of transversely extending parallel cross members which define said V-shaped support frame,
    a pair of upstanding side frame walls comprising rigid cover panels,
    each said side frame wall of said pair of upstanding side frame walls is interconnected to the outward portion on each side of the V-shaped support frame by said plurality of transversely extending cross members of said support frame,
    each said frame wall angularly inclined outward oppositely from one another above said V-shaped support frame, wherein each frame wall is disposed longitudinally along the support frame,
    boat hull support planks mounted on and extending longitudinal across said cross members of said support frame inwardly from a boat access end of said trailer,
    guide planks mounted on and extending longitudinal with said frame walls inwardly from said boat access end of said trailer,
    each said side frame wall comprising a canopy guide and support channel within said side frame wall,
    said retractable canopy portion comprising, a plurality of interconnected upstanding canopy frames having U-shaped canopy ribs, canopy frame wheel assemblies mounted on free ends of said canopy ribs adapted for registerable engagement within said respective canopy guide and support channel, flexible fabric panels extending between said canopy frames defining collapsible side and top surface portions, said canopy frames slidably disposed from a collapsed open access position to an expanded covered closed position, a boat access closure panel removable secured to one of said upstanding canopy frames,
    said support frame comprising flexible bottom covers for selectively covering portions of a bottom of said cross support members extending between said respective frame walls.

2. The boat trailer set forth in claim 1 wherein said fabric panels extending between said canopy frames defining display surface areas thereon, sponsorship indicia on said display surface areas.

3. The boat trailer set forth in claim 1, wherein said boat access closure panel comprises a flexible fabric distortable closure cover extending from an end of said upstanding canopy frame to said support frame.

4. The boat trailer set forth in claim 1, wherein said trailer hitch extends from a toe end portion of said V-shaped support frame, said toe end portion comprises an enclosure that extends beyond said retractable canopy portion, said toe end portion enclosure comprises an access door.

5. The boat trailer set forth in claim 1 wherein said support frame has an auxiliary wheel support on one end thereof adjacent said trailer hitch.

6. The boat trailer set forth in claim 1, wherein said canopy guide and support channels define vertically aligned dual registration tracks for receiving said canopy frame wheel assemblies between said vertically aligned registration tracks.

\* \* \* \* \*